(12) United States Patent
Burlington et al.

(10) Patent No.: US 7,731,618 B2
(45) Date of Patent: Jun. 8, 2010

(54) CLUTCH MECHANISM

(75) Inventors: Guy James Burlington, Stroud (GB); Martin David Townsend, Bristol (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 367 days.

(21) Appl. No.: 11/547,039

(22) PCT Filed: May 5, 2005

(86) PCT No.: PCT/GB2005/001723

§ 371 (c)(1),
(2), (4) Date: Oct. 3, 2006

(87) PCT Pub. No.: WO2005/107553

PCT Pub. Date: Nov. 17, 2005

(65) Prior Publication Data

US 2008/0105510 A1 May 8, 2008

(30) Foreign Application Priority Data

May 6, 2004 (GB) ................. 0410081.4

(51) Int. Cl.
*F16H 35/10* (2006.01)
*F16D 19/00* (2006.01)
*F16P 3/00* (2006.01)
*A47L 5/38* (2006.01)

(52) U.S. Cl. ............ 475/263; 192/93 A; 192/150; 15/308

(58) Field of Classification Search ........ 475/173, 475/257, 263, 264; 15/308; 192/82 T, 104 R, 192/150, 84.6, 93 A See application file for complete search history.

(56) References Cited

U.S. PATENT DOCUMENTS 2,037,648 A 4/1936 Bergstrom
2,633,597 A 4/1953 Turner (Continued)

FOREIGN PATENT DOCUMENTS

DE 2312636 9/1974

(Continued)

OTHER PUBLICATIONS

International Search Report mailed Aug. 25, 2005, for related PCT Application No. PCT/GB2005/001702; 5 pages.

(Continued)

*Primary Examiner*—Roger Pang
(74) *Attorney, Agent, or Firm*—Morrison & Foerster LLP

(57) ABSTRACT

A clutch mechanism includes clutch members having an engaged position, in which torque generated by a drive is transmitted to an output, and a disengaged position, in which torque is not transmitted to the output. The clutch members are capable of slipping with respect to each other in order to prevent damage caused by overload conditions. The clutch mechanism further comprises an actuator associated with a clutch member. If the clutch members slip and a characteristic associated with slipping of the clutch members, such as the temperature rise of the slipping surfaces or the relative rotational speed of the clutch members is above a predetermined value, transmission of torque to the output is interrupted. The clutch mechanism is particularly suited for inclusion in a drive mechanism for the agitator of a surface treating appliance, such as a vacuum cleaner.

8 Claims, 4 Drawing Sheets

U.S. PATENT DOCUMENTS

| | | | |
|---|---|---|---|
| 2,879,874 A | | 3/1959 | Malmros |
| 3,425,528 A | | 2/1969 | Perruca |
| 3,861,228 A | * | 1/1975 | Adams .......................... 474/19 |
| 3,903,712 A | | 9/1975 | Richter et al. |
| 4,025,832 A | * | 5/1977 | Jones, III ..................... 388/822 |
| 4,099,291 A | * | 7/1978 | Bowerman ................... 15/390 |
| 4,220,231 A | * | 9/1980 | Richter et al. .............. 192/82 T |
| 4,245,370 A | * | 1/1981 | Baker .......................... 15/319 |
| 4,357,730 A | | 11/1982 | Lex |
| 4,370,690 A | | 1/1983 | Baker |
| 4,561,529 A | | 12/1985 | McIntosh |
| 4,572,343 A | * | 2/1986 | Boffelli ................... 192/56.41 |
| 4,624,153 A | * | 11/1986 | Itoh et al. ...................... 475/66 |
| 4,660,247 A | | 4/1987 | Frohbieter et al. |
| 4,722,426 A | | 2/1988 | Bellanger |
| 5,701,633 A | | 12/1997 | Jonischus |
| 6,085,382 A | | 7/2000 | Bobrosky et al. |
| 6,120,399 A | * | 9/2000 | Okeson et al. ................. 474/14 |
| 6,400,048 B1 | | 6/2002 | Nishimura et al. |
| 6,437,465 B1 | | 8/2002 | Nishimura et al. |
| 6,484,352 B2 | | 11/2002 | Huebsch et al. |
| 6,553,611 B2 | | 4/2003 | Huebsch et al. |
| 6,662,882 B2 | * | 12/2003 | Hansson ..................... 173/178 |
| 2001/0039691 A1 | | 11/2001 | Bobrosky et al. |
| 2002/0128117 A1 | | 9/2002 | Schroder et al. |
| 2004/0112705 A1 | * | 6/2004 | Watt ........................ 192/54.52 |
| 2005/0091783 A1 | | 5/2005 | Sepke et al. |
| 2006/0075599 A1 | | 4/2006 | Kimmerle et al. |
| 2006/0191097 A1 | | 8/2006 | Baumhakel |
| 2006/0195991 A1 | | 9/2006 | Baumhakel |
| 2008/0022486 A1 | | 1/2008 | Burlington |

FOREIGN PATENT DOCUMENTS

| | | |
|---|---|---|
| DE | 4412986 A1 | 10/1995 |
| DE | 19805899 C1 | 7/1999 |
| DE | 20115407 U1 | 1/2002 |
| GB | 147507 | 11/1921 |
| GB | 2364556 A | 1/2002 |
| JP | 01-120441 A | 5/1989 |
| JP | 08-126596 A | 5/1996 |
| JP | 2001-017358 | 1/2001 |
| WO | WO-99/29223 A1 | 6/1999 |

OTHER PUBLICATIONS

International Preliminary Report on Patentability for related PCT Application No. PCT/GB2005/001702; 7 pages.

Burlington, G., U.S. Office Action mailed Oct. 28, 2009, directed to related U.S. Appl. No. 11/579,632; 7 pages.

* cited by examiner

CLUTCH MECHANISM

REFERENCE TO RELATED APPLICATIONS

This application is a national stage application under 35 USC 371 of International Application No. PCT/GB2005/001723, filed May 5, 2005, which claims the priority of United Kingdom Application No. 0410081.4, filed May 6, 2004, the contents of both of which prior applications are incorporated herein by reference.

FIELD OF THE INVENTION

This invention relates to a clutch mechanism, such as that employed in conjunction with the drive of the agitator of a vacuum cleaner.

BACKGROUND OF THE INVENTION

Vacuum cleaners typically comprise a downwardly directed dirty-air inlet arranged in the cleaner head or a floor tool, through which dirty air is sucked, by means of a motor-driven fan, into dirt and dust separation apparatus. An agitator, such as a brush bar, may be arranged in the mouth of the dirty air inlet so as to agitate the fibres of a carpet over which the vacuum cleaner is passed. The agitator helps to release dirt and dust trapped in the carpet. The agitator is normally driven by means of a motor via a gear or belt transmission system. The motor may be a dedicated agitator motor or a turbine, or may be the vacuum motor that powers the cleaner.

It is desirable to be able to bring the agitator into and out of operation. In the case that the agitator is driven by a dedicated motor, the motor may simply be switched on and off. If the agitator is driven by the vacuum motor, a clutch mechanism may be provided. When the clutch is engaged, torque generated by the motor is applied to the agitator. When the clutch is disengaged, torque is not applied to the agitator.

A problem which may be encountered with vacuum cleaners having an agitator is that, on occasion, the agitator may become jammed by becoming entangled with objects on the floor surface, for example, or by being pressed hard into the floor. Turbine drives have the advantage of being self-limiting in an overload situation, but impose a loss of air-watts at the suction opening. Where the agitator is driven by a dedicated motor, it is relatively straightforward to sense such overload conditions. For example, the rise in current caused by the increase in load can be detected and the motor electrically switched off. However, where the agitator is driven by the vacuum motor, sensing of such overload conditions is more difficult.

Therefore, it has been proposed to provide means for limiting the torque applied to the jammed agitator by, for example, causing the drive belt to slip. However, over time, the belt deteriorates and so needs replacing periodically. This is a nuisance to the user.

A further problem with conventional torque limiters is that they may respond immediately to an overload condition. Such limiters do not allow for momentary overloads such as may occur when the agitator is momentarily pushed into the pile of the carpet, for example.

SUMMARY OF THE INVENTION

The invention provides a clutch mechanism comprising clutch members having an engaged position, in which torque generated by a drive is transmitted to an output and a disengaged position in which torque is not transmitted to the output, the clutch members being capable of slipping, the mechanism further comprising an actuator associated with a clutch member and arranged so that, if the clutch members slip and a characteristic associated with slipping of the clutch members is above a predetermined value, transmission of torque to the output is interrupted.

Advantageously, the characteristic is a thermal characteristic. Thus, the actuator may disengage the drive when the temperature of the slipping surfaces rises above a predetermined value, or when the change in temperature is above a predetermined rate or when the temperature rises above a value for a certain time period.

Alternatively, the characteristic is the relative speed of rotation of one clutch member with respect to the other during slipping. Thus, the actuator may be arranged to interrupt torque when the relative speed rises above a predetermined value, or when the change in relative speed is above a predetermined rate or when the relative speed rises above a value for a certain time period.

The provision of an actuator that is activated by the temperature rise caused by slippage of the friction surfaces, or the speed of rotation of the slipping surfaces, ensures that transmission of torque is interrupted when the load on the agitator exceeds a predetermined value. Furthermore, the invention reduces the likelihood of nuisance tripping, because the excessive load has to act on the agitator for a period of time (typically a few seconds) before the temperature or speed rises sufficiently to activate the overload means. This feature also helps prevent unwanted activation of the overload means on start-up of the agitator.

BRIEF DESCRIPTION OF THE DRAWINGS

The invention will now be described, by way of example, with reference to the accompanying drawings, in which.

Like reference numerals refer to like parts throughout the specification.

DETAILED DESCRIPTION OF THE INVENTION

Figure 1:
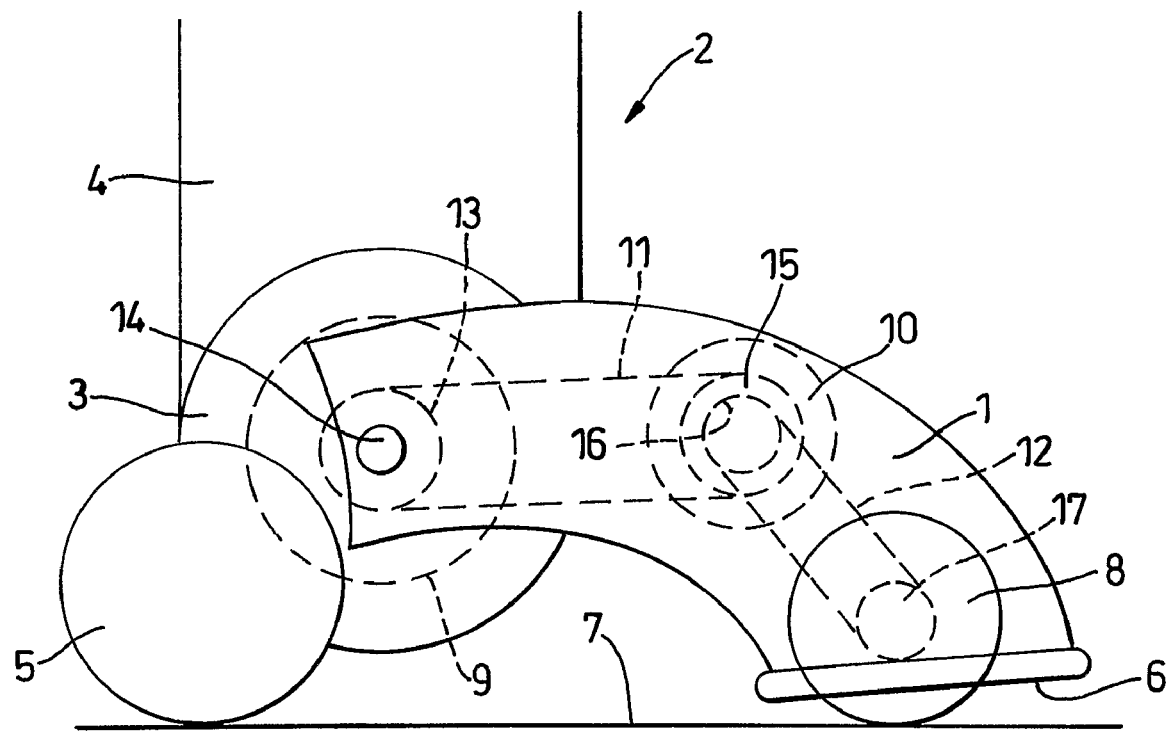
FIG. 1 is a schematic side view of the cleaner head of a vacuum cleaner incorporating a clutch mechanism according to a first embodiment of the invention.

FIG. 1 illustrates schematically the cleaner head 1 of a vacuum cleaner, indicated generally by the reference numeral 2. The cleaner head 1 is pivotably mounted on a motor housing 3 located at the lower end of a main body 4 in which dust-separating apparatus (not shown) is housed. The dust separating apparatus may take the form of a dust bag, cyclonic separator or other filter. A pair of wheels 5 is also mounted on the motor housing 3, from which the cleaner head 1 extends in a forward direction.

The cleaner head 1 has a dirty air inlet 6 located at its forward end and facing downwardly so that, in use, the dirty air inlet 6 rests on the surface 7 to be cleaned, which usually is a floor or carpet. An agitator in the form of a brush bar 8 is rotatably mounted in a known manner by means of bearings (not shown) so that the brush bar 8 extends across substantially the entire width of the dirty air inlet 6. The brush bar 8 protrudes slightly out of the dirty air inlet 6 so as to agitate the fibres of a carpet being cleaned and so enhance the cleaning process.

A motor 9 is housed within the motor housing 3. The motor 9 may be used to drive the brush bar 8 directly or via a gearing mechanism. In the embodiment shown in FIG. 1, a clutch mechanism 10 is provided, located between the motor 9 and the brush bar 8. Drive belts 11, 12 are arranged so as to transfer torque from the motor 9 to the clutch mechanism 10 and from the clutch mechanism to the brush bar 8 respectively. The motor 9 can be any motor suitable for use in a domestic vacuum cleaner. It must be able to receive a drive belt 11 and therefore carries a drive pulley 13 for receiving the drive belt 11. The drive belt 11 could equally be carried directly on the motor shaft 14. The drive belt 11 is also carried by a driven pulley 15 forming part of the clutch mechanism 10. The clutch mechanism 10 also has a drive pulley 16 which carries the drive belt 12, which is also carried by a pulley 17 on the brush bar 8. The relative diameters of the pulleys 13, 14, 15, 16 are designed to gear down the rotational speed of the motor (commonly 30-40 k rpm) to a suitable rotation speed for the brush bar 8. A suitable rotational speed for a brush bar is typically 3.5-5 k rpm. The brush bar 8 can be of any known design, preferably having a flared bristle arrangement at the edges thereof to facilitate edge-to-edge cleaning.

Figure 2:
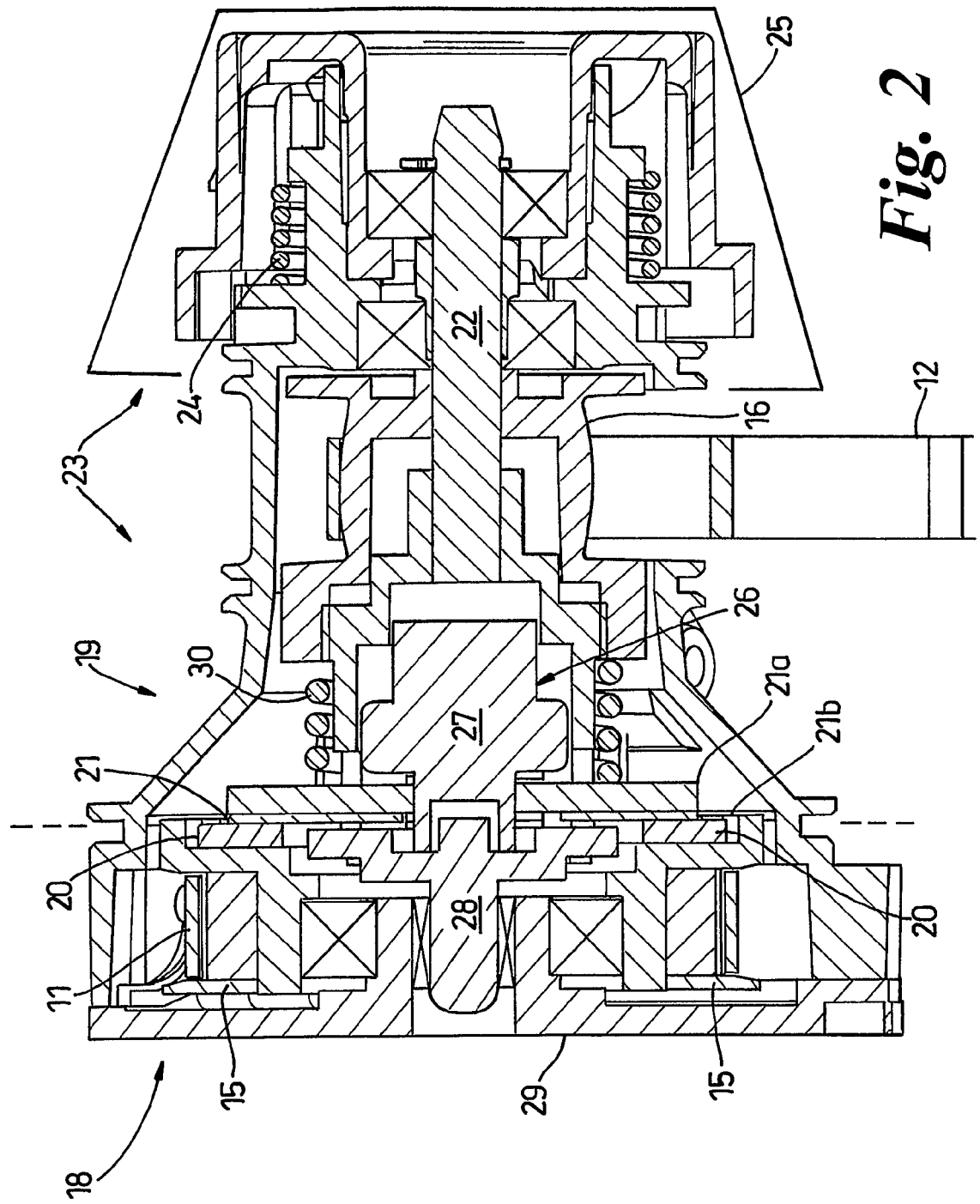
FIG. 2 is a sectional side view of the clutch mechanism of FIG. 1.

An embodiment of a clutch mechanism constructed in accordance with the invention is shown in more detail in FIG. 2. The clutch mechanism 10 generally comprises two clutch members 18, 19. The first clutch member 18 includes the driven pulley 15. Torque generated by the motor is continuously transmitted to the first clutch member at the driven pulley. The first clutch member 18 also includes a friction plate 20 arranged to engage with a surface of the second clutch member 19.

The second clutch member 19 includes a clutch plate 21 and a spindle 22 associated with the drive pulley 16. In this embodiment, the clutch plate 21 comprises a thermally conductive part 21*a* and a hard-wearing coating 21*b*. The thermally-conductive part 21*a* is typically a brass plate and the coating 21*b* is a layer of steel, for example. Clutch engagement means 23 are also provided and arranged to bring the second clutch member laterally into and out of engagement with the first clutch member 18. The clutch engagement means 23 includes helical springs 24, 30 and a manual grip portion 25. Rotation of the clutch engagement means 23 is translated in to lateral motion of the second clutch member 19 with respect to the first clutch member 18.

FIG. 2 shows the clutch mechanism 10 in an engaged position. The compression spring 30 is acting so as to press the second clutch member 19 against the first clutch member 18. The spindle 22 is pressed to the left by means of the spring 30 and the clutch plate 21 of the clutch member 19 is thus pressed firmly against the friction plate 20 of the clutch member 18. This pressing contact means that any rotation of the friction plate 20 causes the clutch plate 21 to rotate.

This is then the normal driving position of the clutch mechanism 10. When the motor rotates the drive belt 11, the driven pulley 15 is rotated. This causes the first clutch member 18 including the friction plate 20 to rotate and, because of the pressing force between the friction plate 20 and the clutch plate 21, the clutch member 19 also rotates. This causes rotation of the spindle 22 and hence the drive pulley 16. Thus, torque is transmitted via the belt 12 to the brush bar 8.

When the vacuum cleaner 2 is to be used for above-floor cleaning, the handle of the vacuum cleaner will be brought into the upright position. The relative movement between the main body 4 and the cleaner head 1 can be used to rotate the clutch engagement means 23 and hence cause the clutch member 19 including the spindle 22 to move laterally away from the first clutch member by a few millimeters. Thus, the pressing force between the friction plate 20 and the clutch plate 21 is released and torque is not transmitted therebetween.

In the disengaged position, the driven pulley 15 is still driven by the motor via the drive belt 11. Although the first clutch member 18 is rotated with the driven pulley 15, the friction plate 20 does not drive the clutch plate 21. The clutch member 19 therefore remains static, including the spindle 22 and the drive pulley 16. In this position, the torque transmitted to the driven pulley 15 by the drive belt 11 is not transmitted to the drive pulley 16. Hence, the brush bar 8 does not rotate.

The grip portion 25 is provided so that the user of the vacuum cleaner 2 can put the clutch mechanism 10 into the disengaged position at any time. This facility is useful in a number of situations, particularly when the vacuum cleaner 2 is being used on an un-carpeted floor and the brush bar 8 is not required. The spring 24 is provided to assist in returning the clutch mechanism fully to the disengaged position.

It sometimes happens that, in use, the brush bar 8 becomes jammed and therefore the torque required to turn the brush bar is drastically increased. There can also be an appreciable increase in the torque required to turn the brush bar if the vacuum cleaner is used on a carpet having a very long pile. When the torque is increased beyond a predetermined level, there can be a serious risk of damage occurring to components of the vacuum cleaner, especially the drive belts 11, 12. If the brush bar 8 becomes jammed or the torque required to turn it is too great, the drive pulley 16 should not be made to rotate. Thus, the clutch is arranged so that, in this overload situation, there is forced relative rotation between the friction plate 20 and the clutch plate 21. Hence, the second clutch member 19 slips in relation to the first clutch member 18.

In accordance with the invention, the clutch mechanism 10 includes a thermal actuator 26. In this embodiment, the actuator 26 comprises a housing 27, made of a good thermal conductor, and a pin 28 extending from the housing. The housing 27 includes a thermal expansion material, such as wax. The housing 27 is incorporated in the second clutch member 19. The free end of the pin 28 is arranged adjacent an end plate 29 of the driven pulley 15.

When the clutch mechanism 10 is overloaded, the surfaces of the friction plate 20 and clutch plate 21 slip with respect to each other, and so produce heat energy. The actuator 26 is in thermal contact with the plate 21, and so heat energy is conducted into the housing 27 of the actuator. As the housing 27 rises in temperature, the wax inside is warmed and expands, thus forcing out the pin 28 further. The housing 27 moves by the force of the extending pin. This urges the clutch member 19 away from the clutch member 18 against the force of the compression spring 30. Thus, the clutch members 18, 19 move apart and the friction plate 20 is spaced from the clutch plate 21. Thus, the clutch mechanism 10 becomes disengaged and torque produced at the driven pulley 15 is not transmitted to the drive pulley 16.

The actuator 26 may be arranged to disengage the clutch when the temperature has risen above a predetermined level. Alternatively, the actuator may be arranged, in combination with suitable electronic circuitry (not shown), to come into effect when the temperature rises at a fast rate or when the temperature rises beyond a certain point for a predetermined period of time. The choice and set-up of a suitable actuator is within the abilities of the skilled person.

Of course, the invention is applicable to other drive systems arranged to produce motoring torque. For example, an agitator need not be driven by means of a system of drive belts, but may instead be directly driven by the motor arranged to drive the fan of the vacuum cleaner. A suitable motor arrangement incorporating an alternative clutch mechanism in the form of speed reduction gearing is illustrated in FIG. 3.

The clutch mechanism is indicated generally by the reference numeral 31 and is shown in the disengaged position. The associated motor is encased in a housing known as a motor bucket 32 and so is not visible in this drawing, save for its output shaft 33. A gear system 34 is mounted directly to the rear of the motor bucket 32, onto the shaft 33. The gear system 34 is arranged to reduce the high rotational speed of the output shaft 33 down to a more suitable speed for rotating the brush bar. In this embodiment, the speed-reduction gear system 34 comprises an epicyclic system, although other speed-reduction gearing could be used.

The epicyclic gear system 34 comprises a sun gear 35 that, in this arrangement is the input gear. The sun gear 35 may be pushed on to the end of the motor shaft 33 or may be an integral part of the shaft. The sun gear 35 shown in FIG. 2 has been cut into the motor shaft 33. The sun gear 35 meshes with a plurality of planet gears 36, 37, 38, arranged equidistantly around the sun gear 35. Only two of the planet gears are visible in this drawing, and are shown without teeth for clarity. The planet gears 36, 37, 38 share the load and provide balance to the gear system 34. The planet gears 36, 37, 38 are rotatably arranged inside a ring gear 39. The gear system 34 further comprises an output in the form of a planet carrier 40. The general scheme of operation of the gear system will now be described with reference to FIG. 4a.

Figure 3:
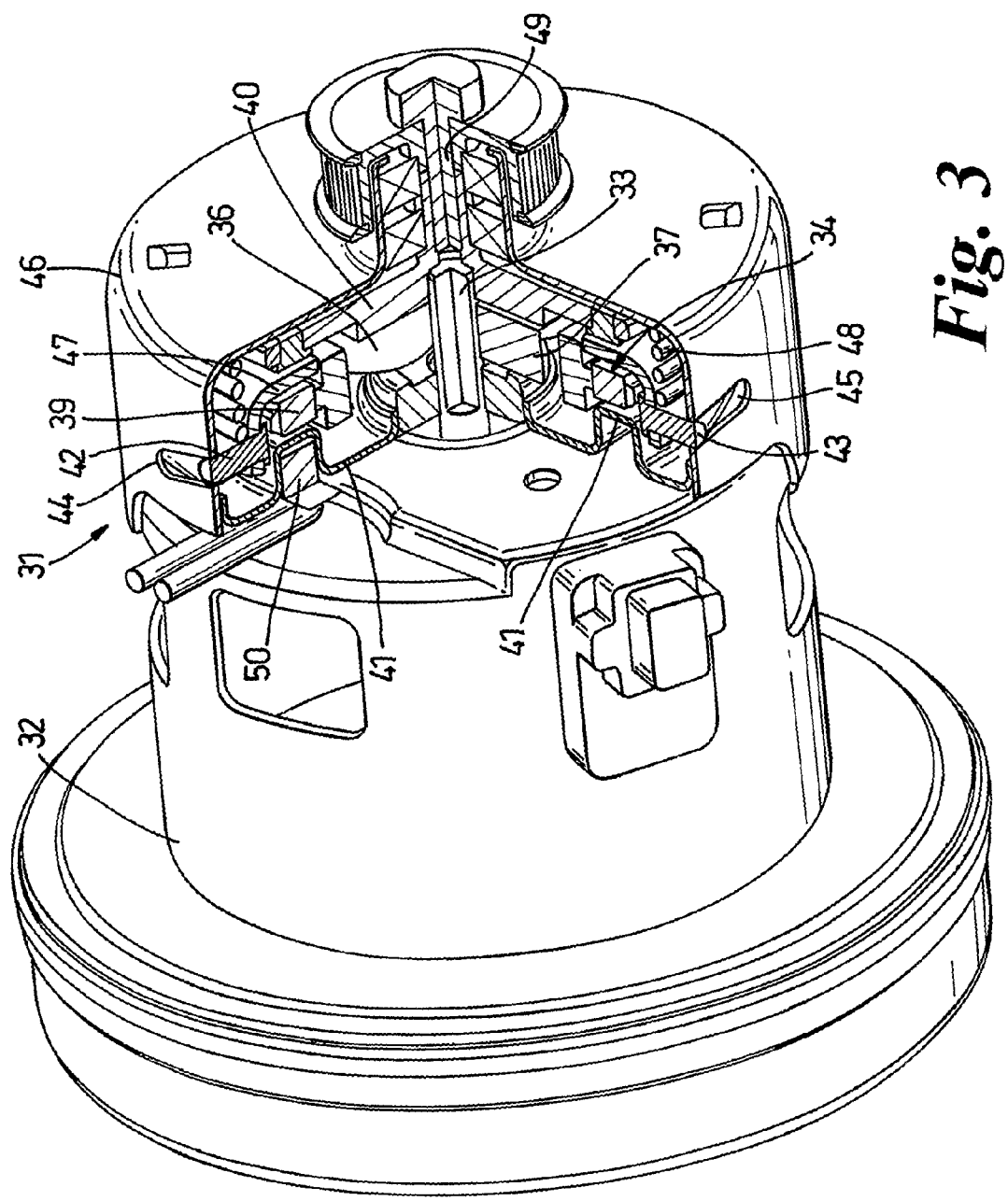
FIG. 3 is a partly sectional perspective view of a motor incorporating an alternative clutch mechanism in the form of a speed reduction clutch.
Figure 4A:
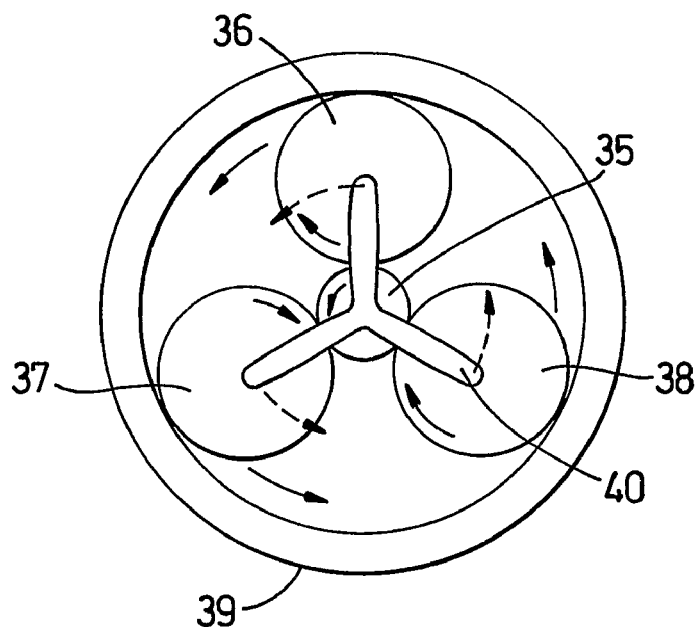
FIGS. 4a and 4b are sectional side views of part of a speed reduction gearing for the clutch mechanism of FIG. 3, in two modes of operation.

FIG. 4a schematically shows an epicyclic gear system similar to that in FIG. 3. In this drawing, the planet carrier is shown as a member having three arms, so that the rest of the gear train is visible. In the embodiment of FIG. 3, the planet carrier 40 is actually in the form of a disc having three collars arranged to engage with respective central apertures of the planet gears, and having a short output shaft. As with FIG. 3, the gear system shown in this drawing does not include gear teeth for clarity.

In operation, torque is input to the gear system by means of the central sun gear 35. The planet gears 36, 37, 38 mesh with the central sun gear 35 and try to rotate in the opposite rotational direction to the sun gear. Each planet gear 36, 37, 38 meshes with teeth on the internal diameter of the ring gear 39. Thus, as the planet gears 36, 37, 38 rotate, they roll along the inner surface of the ring gear 39, and so the gears themselves move in the same direction as the direction of rotation of the sun gear. This motion, in turn, causes the planet carrier to move in the same direction (shown by the broken arrow). Hence, torque imparted to the sun gear 35 is transmitted to the planet carrier 40, albeit at a reduced rotational speed.

Referring back to FIG. 3, one of the clutch members of the clutch mechanism 31 includes a plate 41 attached to the rear of the motor bucket 32. The other of the clutch members includes the ring gear 39. Clutch engagement means is provided in the form of cam members, two of which 42, 43 are shown in part in FIG. 3. The cam members 42, 43, are constrained to move in slots 44, 45 respectively, which extend obliquely around the housing 46 for the gear system 34. Rotation of the cam members 42, 43 along the slots 44, 45 causes the cam members to move laterally. Clockwise rotation of the cam members 42, 43, as viewed in this drawing, causes the cam members to move towards the motor bucket 32. A disc 47 is associated with the cam members 42, 43, such that rotation of the cam members causes movement of the disc along the axis of the shaft 33. The disc 47 is arranged adjacent the ring gear 39 such that clockwise rotation of the cam members 42, 43 causes the disc to bear against the ring gear. Thus, the ring gear 39 is pressed into intimate contact with the plate 41. The spring 48 assists in urging the clutch into the engaged position. The clutch disengages against the action of the spring 48. In this manner, the clutch members can be brought into and out of engagement.

When the clutch mechanism 31 is in the engaged position, the ring gear 39 is held stationary against the plate 41. A spindle 49 associated with the second clutch member engages the end of the planet carrier 40. When the motor rotates the shaft 33, torque is transmitted to the sun gear 35 and to the planet carrier 40 by means of the planet gears 36, 37, 38. Hence, torque is transmitted to the spindle 49 and this rotary motion, at a reduced speed from that output by the motor, is employed to drive the brush bar.

Figure 4B:
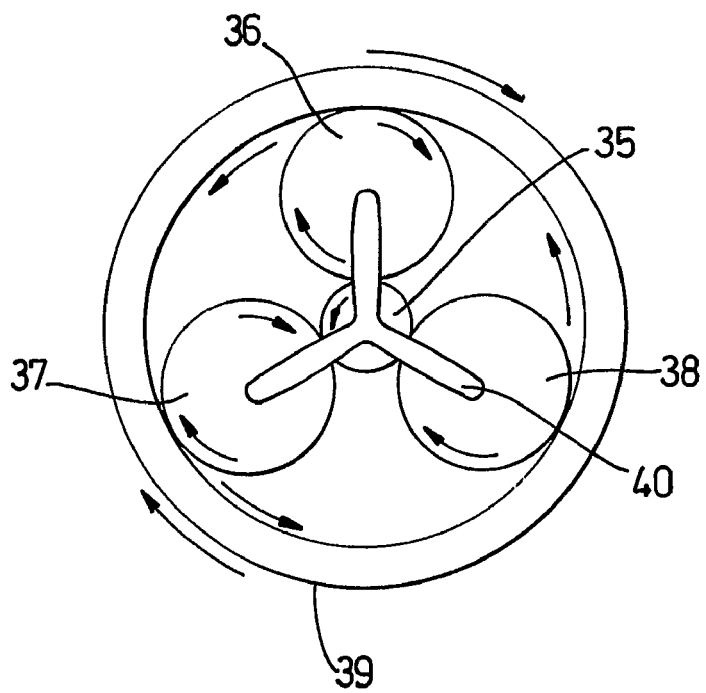

In the event of excessive load being placed on the brush bar such that the brush bar becomes jammed, the planet carrier 40 comprising the output of the gearing system 34 is held stationary. In this situation, torque generated by the motor and input to the gearing system by means of the sun gear 35 causes the ring gear 39 to rotate. The ring gear 39 turns whilst in intimate contact with the plate 41 attached to the rear of the motor bucket 32. Thus, the edge of the ring gear 39 slips against the corresponding surface on the plate 41, thereby generating heat energy. FIG. 4b shows the rotational directions of the components of the gear system 34 during an overload condition.

An actuator in the form of a thermally activated switch 50 is located in the space between the motor bucket 32 and the plate 41, and is in thermal contact with the plate. Thus, as the plate 41 heats up, the temperature at the actuator 50 rises. When the temperature at the actuator 50 exceeds a predetermined value, the switch is arranged to switch off the motor completely. Thus, torque is not transmitted to the brush bar by virtue of inoperation of the motor.

Alternatively, the actuator 50 may take the form of a switch arranged to interrupt transmission of torque in dependence on the rotational speed of the ring gear 39. For example, the actuator may cause the motor to be switched off when the rotational speed of the ring gear 39 exceeds a predetermined value. Alternatively, the rate of change of speed may be employed to trip the switch or else a predetermined rotational speed for a predetermined time period.

This embodiment of the invention, in which the rotational speed of one clutch member with respect to the other is used as the trigger to interrupt transmission of torque, is particularly suitable for the clutch arrangement of FIG. 3. This is because, during slipping, the clutch member 18 is stationary with respect to the slipping clutch member 19. Thus, the absolute speed of slippage can be measured with certainty.

The actuator 50 may be arranged to restart the motor when, for example, the actuator has cooled to below a predetermined temperature or when the rotational speed of slippage of the clutch member 19 is below a predetermined value. However, for safety reasons, it may be preferable to arrange that the user resets the system by switching the cleaner off at the mains power supply and then on again.

The above embodiments of the invention reduce or even prevent damage being caused to components of the vacuum cleaner during overload by preventing torque from being applied to the brush bar. The provision of an actuator that responds to a rise in a characteristic (such as temperature or speed) of the slipping clutch members reduces the risk of false triggering caused by momentary rises in load, such as occurs on start-up of the brush bar.

Variations may be made without departing from the scope of the invention. For example, the actuator 23 of FIG. 2 producing a physical disengagement of the clutch may be interchangeable with the actuator 50 of FIG. 3 producing electrical disengagement of the motor. In both embodiments, the effect is that the system does not attempt to transmit torque to an overloaded brush bar.

Suitable thermal actuators include those incorporating bimetallic devices and so-called memory metals. Suitable speed actuators include those incorporating optical sensors and magnetic detectors, such as Hall effect sensors, arranged to detect a marker on the ring gear.

The invention has been described with reference to a brush bar, rotatably driven in a vacuum cleaner. However, the invention is equally applicable to other forms of agitator or other surface-treating devices, including those arranged to oscillate in a surface-treating head. The invention is also suitable for other drives incorporating a clutch mechanism.

The invention claimed is:

1. A clutch mechanism comprising:
    two clutch members each having an engaged position, in which torque generated by a drive is transmitted to an output, and a disengaged position, in which torque is not transmitted to the output, the clutch members being capable of slipping;
    an actuator associated with one of the clutch members and configured so that, if the clutch members slip and the rotational speed of one clutch member slipping relative to the other is above a predetermined value, the actuator interrupts transmission of torque to the output;
    a gearing system including an epicyclic gear train and configured to provide an output of reduced rotational speed relative to that generated by the drive;
    a housing, substantially enclosing the clutch members, having at least one slot; and
    at least one cam member for moving at least one of the clutch members towards the engaged position, the at least one cam member configured to move in the at least one slot, such that movement of the cam member in the slot controls the moving of the clutch members towards the engaged position.

2. The clutch mechanism of claim 1, comprising a disc associated with the at least one cam member configured such that movement of the at least one cam member in the slot moves the disc against at least one of the clutch members.

3. The clutch mechanism of claim 2, wherein the disc is arranged adjacent to at least one of the clutch members.

4. The clutch mechanism of claim 1, comprising a spring for urging the at least one cam member to move in the slot so as to move at least one of the clutch members towards the engaged position.

5. The clutch mechanism of claim 1, wherein the actuator comprises a switch configured to interrupt the generation of torque by the drive by switching off the drive.

6. The clutch mechanism of claim 1, wherein the output is configured to rotate an agitator of a surface treating appliance.

7. An agitator for a surface treatment device including the clutch mechanism of claim 1.

8. The agitator of claim 7, wherein the agitator is in the form of a brush bar for a vacuum cleaner.

* * * * *